(12) United States Patent
Takikawa et al.

(10) Patent No.: US 10,030,739 B2
(45) Date of Patent: Jul. 24, 2018

(54) DAMPER DEVICE AND STARTING DEVICE

(71) Applicants: AISIN AW CO., LTD., Anjo-shi, Aichi-ken (JP); AISIN AW INDUSTRIES CO., LTD., Echizen-shi, Fukui (JP)

(72) Inventors: Yoshihiro Takikawa, Aichi (JP); Yoichi Oi, Aichi (JP); Takayuki Miyaoka, Aichi (JP); Yuichiro Hirai, Aichi (JP); Makoto Yamaguchi, Fukui (JP); Takuya Yoshikawa, Fukui (JP); Tomonori Kinoshita, Fukui (JP); Aki Ogawa, Fukui (JP); Masahiro Hata, Fukui (JP)

(73) Assignees: AISIN AW CO., LTD., Anjo-shi, Aichi-ken (JP); AISIN AW INDUSTRIES CO., LTD., Echizen-shi, Fukui (JP)

( * ) Notice: Subject to any disclaimer, the term of this patent is extended or adjusted under 35 U.S.C. 154(b) by 463 days.

(21) Appl. No.: 14/652,660

(22) PCT Filed: Jan. 30, 2014

(86) PCT No.: PCT/JP2014/052162
§ 371 (c)(1),
(2) Date: Jun. 16, 2015

(87) PCT Pub. No.: WO2014/119685
PCT Pub. Date: Aug. 7, 2014

(65) Prior Publication Data
US 2015/0337934 A1    Nov. 26, 2015

(30) Foreign Application Priority Data

Jan. 30, 2013  (JP) .................................. 2013-015253

(51) Int. Cl.
| | | |
|---|---|---|
| *F16F 15/123* | (2006.01) |
| *F16D 3/66* | (2006.01) |
| *F16D 3/14* | (2006.01) |
| *F16F 15/14* | (2006.01) |
| *F16H 45/02* | (2006.01) |
| *F16D 3/12* | (2006.01) |

(52) U.S. Cl.
CPC .............. *F16F 15/123* (2013.01); *F16D 3/12* (2013.01); *F16D 3/66* (2013.01);
(Continued)

(58) Field of Classification Search
USPC ....................................................... 192/3.29
See application file for complete search history.

(56) References Cited

U.S. PATENT DOCUMENTS

| | | |
|---|---|---|
| 4,559,024 A | 12/1985 | Tamura et al. |
| 7,172,509 B2 | 2/2007 | Yamamoto et al. |

(Continued)

FOREIGN PATENT DOCUMENTS

| | | |
|---|---|---|
| DE | 102004010884 A1 | 10/2004 |
| DE | 112011100661 B4 | 12/2016 |

(Continued)

OTHER PUBLICATIONS

International Search Report of PCT/JP2014/052162, dated May 13, 2014. [PCT/ISA/210].

*Primary Examiner* — Mark A Manley
(74) *Attorney, Agent, or Firm* — Sughrue Mion, PLLC (57) ABSTRACT

A damper device includes a dynamic damper that has third springs coupled to an intermediate member and that also has, as a mass body coupled to the third springs, a turbine runner and a coupling member etc. The third springs of the dynamic damper are disposed so as to overlap both in the axial and radial directions of the damper device second springs that have higher rigidity than first springs and that are disposed inward of the first springs to transfer torque between a drive member and a driven member.

20 Claims, 4 Drawing Sheets

(52) U.S. Cl.
CPC .. *F16F 15/12353* (2013.01); *F16F 15/12366* (2013.01); *F16F 15/145* (2013.01); *F16H 45/02* (2013.01); *F16D 2300/22* (2013.01); *F16H 2045/0221* (2013.01); *F16H 2045/0226* (2013.01); *F16H 2045/0263* (2013.01)

(56) References Cited

U.S. PATENT DOCUMENTS

| | | |
|---|---|---|
| 8,807,310 B2 | 8/2014 | Takikawa et al. |
| 8,839,924 B2 | 9/2014 | Takikawa et al. |
| 2004/0185940 A1* | 9/2004 | Yamamoto ........ F16F 15/12366 464/68.4 |
| 2007/0099710 A1 | 5/2007 | Yamamoto et al. |
| 2012/0080280 A1 | 4/2012 | Takikawa et al. |
| 2012/0080282 A1* | 4/2012 | Takikawa ................ F16H 45/02 192/3.28 |

FOREIGN PATENT DOCUMENTS

| | | |
|---|---|---|
| DE | 112011100632 B4 | 2/2017 |
| JP | 2005-113997 A | 4/2005 |
| JP | 2012-77784 A | 4/2012 |
| JP | 2012-77811 A | 4/2012 |
| WO | 2011/076168 A1 | 6/2011 |

* cited by examiner

DAMPER DEVICE AND STARTING DEVICE

CROSS REFERENCE TO RELATED APPLICATIONS

This application is a National Stage of International Application No. PCT/JP2014/052162 filed Jan. 30, 2014, claiming priority based on Japanese Patent Application No. 2013-015253, filed Jan. 30, 2013, the contents of all of which are incorporated herein by reference in their entirety.

TECHNICAL FIELD

The present subject matter relates to damper devices including an input element, an output element, first elastic bodies that transfer torque between the input element and the output element, and second elastic bodies that are disposed inward of the first elastic bodies to transfer the torque between the input element and the output element, and starting devices including such a damper device.

BACKGROUND ART

Conventionally, a damper device including a dynamic damper that has third elastic bodies coupled to any of the rotary elements forming the damper device and a mass body coupled to the third elastic bodies is known as this type of damper device (see, e.g., Patent Document 1). In this damper device, the third elastic bodies forming the dynamic damper are disposed radially outward or inward of the first and second elastic bodies that transfer torque between the input element and the output element or are disposed between the first and second elastic bodies in the radial direction.

RELATED ART DOCUMENT

Patent Document

[Patent Document 1] International Publication No. 2011/076168 (WO 2011/076168)

SUMMARY OF THE INVENTION

However, in the case where the third elastic bodies of the dynamic damper are disposed at a different radial position from the first and second elastic bodies that transfer torque between the input element and the output element as in the above conventional damper device, the outer diameter of the damper device increases, and it is difficult to make the entire device compact.

It is a primary object to suppress an increase in outer diameter of a damper device including a dynamic damper to make the entire device compact.

The following measures are taken for a damper device and a starting device to achieve the above primary object.

A damper device includes an input element, an output element, first elastic bodies that transfer torque between the input element and the output element, and second elastic bodies that are disposed inward of the first elastic bodies to transfer the torque between the input element and the output element, in which the second elastic bodies have higher rigidity than the first elastic bodies, the damper device includes a dynamic damper having third elastic bodies that are coupled to any of the rotary elements forming the damper device and a mass body that is coupled to the third elastic bodies, and the third elastic bodies are disposed so as to overlap the second elastic bodies both in axial and radial directions of the damper device.

This damper device includes the dynamic damper having the third elastic bodies that are coupled to any of the rotary elements and the mass body that is coupled to the third elastic bodies. The third elastic bodies of the dynamic damper are disposed so as to overlap both in the axial and radial directions of the damper device the second elastic bodies that have higher rigidity than the first elastic bodies and that are disposed inward of the first elastic bodies to transfer the torque between the input element and the output element. This can suppress an increase in outer diameter of the damper device and can make the entire device more compact as compared to the case where the third elastic bodies of the dynamic damper are disposed radially outward or inward of the first elastic bodies and the second elastic bodies or disposed between the first and second elastic bodies in the radial direction. Moreover, in this damper device, the third elastic bodies can be placed without increasing the rigidity of the first elastic bodies. Namely, both the second and third elastic bodies can be placed while the low rigidity of the first elastic bodies is maintained which particularly affects damping capability. That is, reducing the rigidity of the first elastic bodies can reduce the overall rigidity of the damper device and can ensure satisfactory damping capability thereof even if the axial length (circumferential length) of the inner second elastic bodies is reduced. Accordingly, sufficient space can be secured to place the third elastic bodies of the dynamic damper, and the appropriate third elastic bodies according to vibration to be damped can be used. Namely, damping capability of the dynamic damper can be optimized. As a result, in this damper device, the overall damping capability of the device can be ensured, and reduction in size of the device can also be implemented.

The damper device may further include: a centrifugal pendulum vibration absorbing device having a support member that rotates together with any of the rotary elements forming the damper device, and a plurality of pendulum mass bodies that are swingably coupled to the support member. The first elastic bodies may be disposed so as to be shifted from the second elastic bodies in the axial direction, and the plurality of pendulum mass bodies of the centrifugal pendulum vibration absorbing device may be disposed outward of the second and third elastic bodies so as to surround the second and third elastic bodies. The entire damper device including the centrifugal pendulum vibration absorbing device can thus be made compact (in particular, an increase in axial length thereof can be suppressed), and vibration can be damped (absorbed) by the first and second elastic bodies, the dynamic damper including the third elastic bodies, and the centrifugal pendulum vibration absorbing device.

Moreover, the torque may be transferred from the second elastic bodies to the output element, and the output element may be used also as the support member of the centrifugal pendulum vibration absorbing device. The entire damper device including the dynamic damper and the centrifugal pendulum vibration absorbing device can thus be made compact.

The damper device may further include: an intermediate element that is coupled to the input element via the first elastic bodies and coupled to the output element via the second elastic bodies, and the third elastic bodies of the dynamic damper may be coupled to the intermediate element. Vibration of the intermediate member that tends to vibrate between the first and second elastic bodies and overall vibration of the damper device can thus be satisfactorily damped (absorbed) by both the dynamic damper and the centrifugal pendulum vibration absorbing device.

Moreover, the third elastic bodies of the dynamic damper may be coupled to the output element. In this configuration as well, overall vibration of the damper device can be satisfactorily damped (absorbed) by both the dynamic damper and the centrifugal pendulum vibration absorbing device.

A distance between an axis of the damper device and an axis of each of the second elastic bodies may be equal to a distance between the axis of the damper device and an axis of each of the third elastic bodies. This can more satisfactorily suppress an increase in outer diameter of the damper device.

Moreover, the axes of the second elastic bodies and the axes of the third elastic bodies may be included in a same plane perpendicular to the axis of the damper device. This can also suppress an increase in axial length of the damper device and therefore can make the entire device more compact.

The dynamic damper may include a coupling member having a fixed portion that is fixed to the mass body and a plurality of elastic body contact portions each extended from the fixed portion so as to contact an end of a corresponding one of the third elastic bodies, and the plane including the axes of the third elastic bodies and perpendicular to the axis of the damper device may be included in a range of a thickness of the elastic body contact portions in the axial direction of the damper device. Since the plane including the axes of the third elastic bodies and perpendicular to the axis of the damper device are included in the range of the thickness of the elastic body contact portions in the axial direction of the damper device, the third elastic bodies can be more appropriately extended and compressed along their axes, and vibration damping capability of the dynamic damper can further be improved.

A starting device described herein is a starting device including any of the above damper devices, a pump impeller, a turbine runner that together with the pump impeller forms a fluid transmission device, and a lockup clutch, wherein the mass body of the dynamic damper includes the turbine runner. This starting device can thus use the turbine runner as the mass body of the dynamic damper. This eliminates the need to separately provide a mass body of the dynamic damper, and can satisfactorily suppress an increase in overall size of the device.

PREFERRED EMBODIMENTS

A preferred embodiment is described below with reference to the accompanying drawings.

Figure 1:
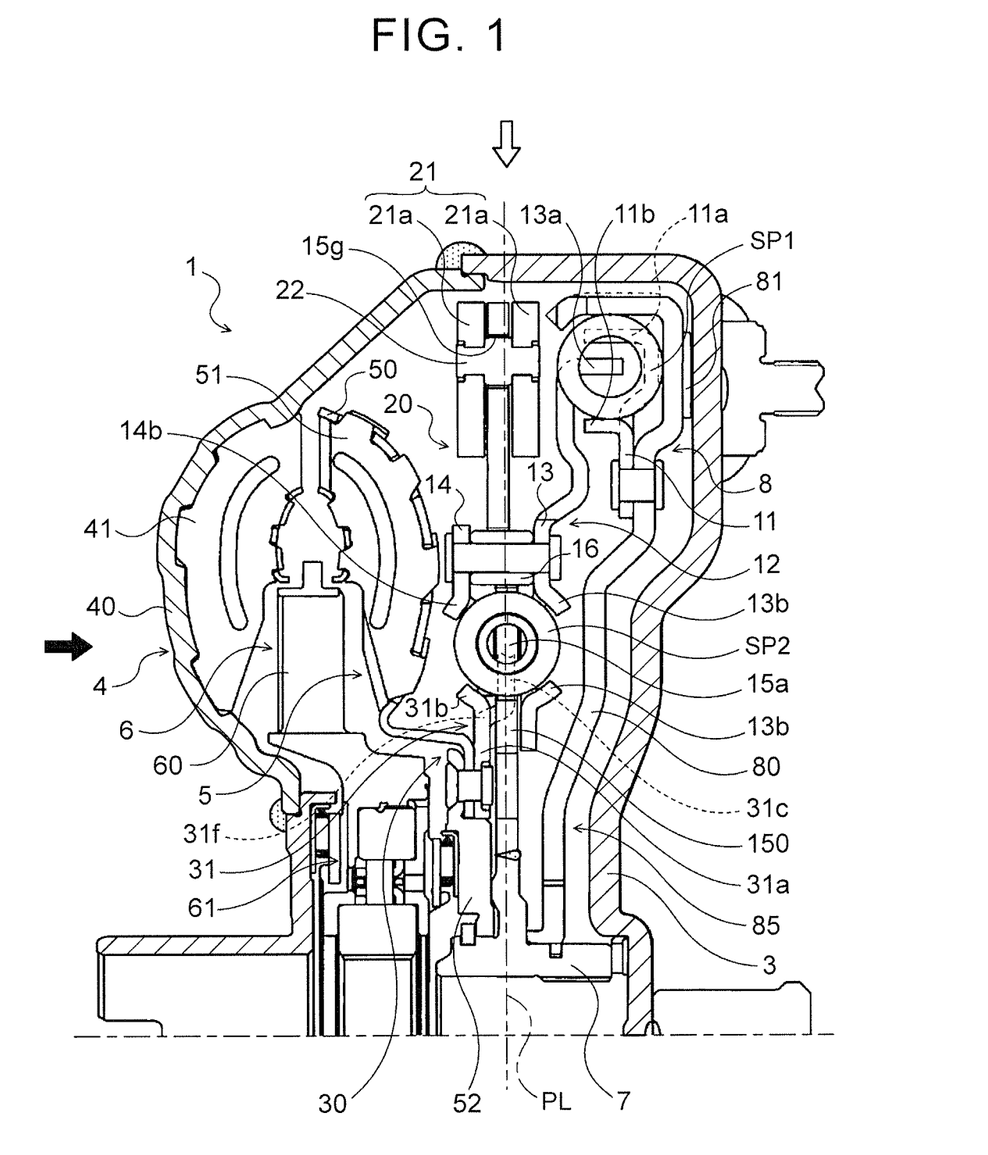
FIG. 1 is a partial sectional view showing a starting device 1 including a damper device 10 according to an embodiment.
Figure 2:
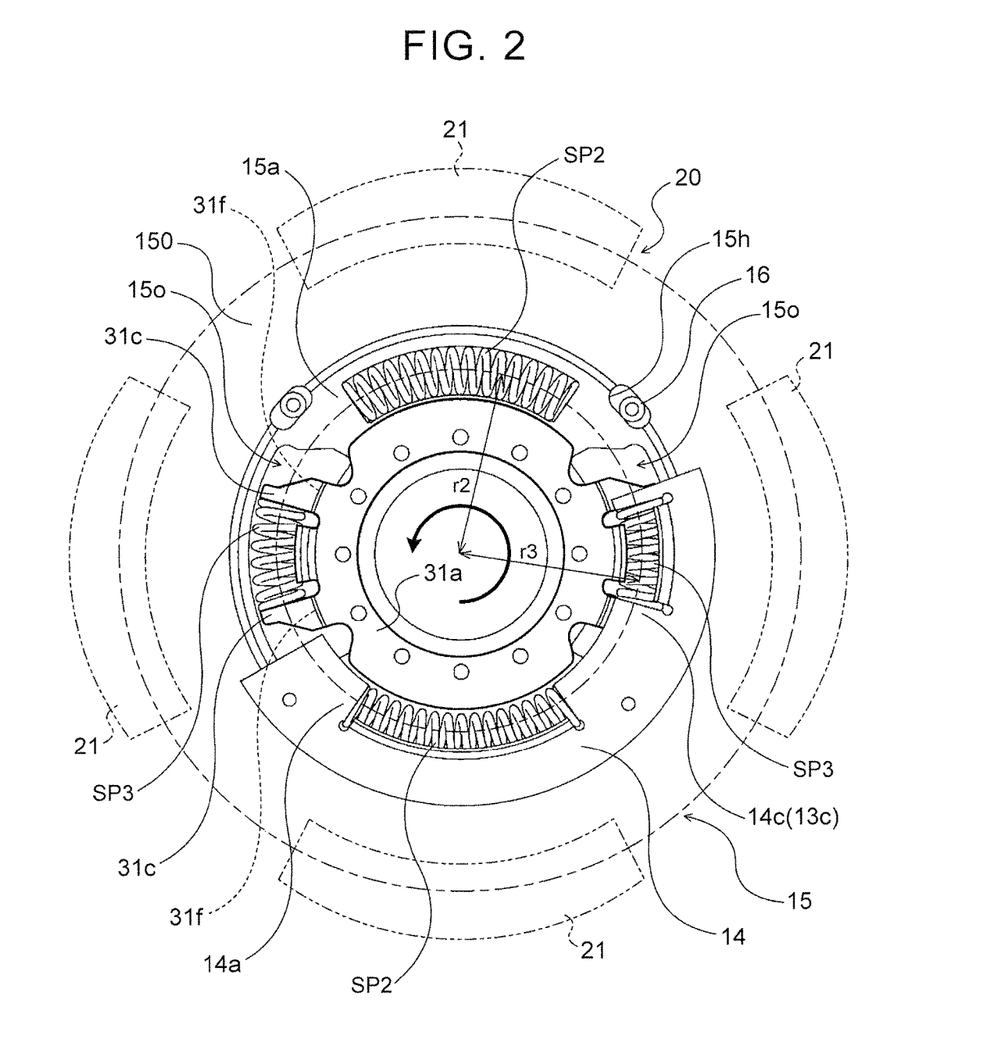
FIG. 2 is a plan view showing a main part of the damper device 10.

FIG. 1 is a partial sectional view showing a starting device 1 including a damper device 10 according to an embodiment. FIG. 2 is a plan view showing a main part of the damper device 10. The starting device 1 shown in these figures is a device to be mounted on a vehicle including an engine (internal combustion engine) serving as a motor, and includes, in addition to the damper device 10, a front cover 3 serving as an input member that is coupled to a crankshaft of the engine, a pump impeller (input-side fluid transmission element) 4 fixed to the front cover 3, a turbine runner (output-side fluid transmission element) 5 capable of rotating coaxially with the pump impeller 4, a damper hub 7 serving as an output member that is coupled to the damper device 10 and fixed to an input shaft IS (see FIG. 3) of a transmission serving as an automatic transmission (AT) or a continuously variable transmission (CVT), a lockup clutch 8 as a hydraulic single-plate clutch, and a centrifugal pendulum vibration absorbing device 20 and a dynamic damper 30 which are coupled to the damper device 10.

The pump impeller 4 has a pump shell 40 that is firmly fixed to the front cover 3, and a plurality of pump blades 41 disposed on the inner surface of the pump shell 40. The turbine runner 5 has a turbine shell 50 and a plurality of turbine blades 51 disposed on the inner surface of the turbine shell 50. The turbine shell 50 is fixed to a turbine hub 52 via a plurality of rivets. The turbine hub 52 is rotatably supported by the damper hub 7, and movement of the turbine hub 52 in the axial direction of the starting device 1 is restricted by a snap ring etc. attached to the damper hub 7. The pump impeller 4 and the turbine runner 5 face each other, and a stator 6 that adjusts the flow of hydraulic oil (working fluid) from the turbine runner 5 to the pump impeller 4 is coaxially disposed between the pump impeller 4 and the turbine runner 5. The stator 6 has a plurality of stator blades 60, and the rotational direction of the stator 6 is set to only one direction by a one-way clutch 61. The pump impeller 4, the turbine runner 5, and the stator 6 form a torus (annular flow path) in which the hydraulic oil is circulated, and function as a torque converter (fluid transmission device) having a torque amplifying function. In the starting device 1, the stator 6 and the one-way clutch 61 may be omitted, and the pump impeller 4 and the turbine runner 5 may function as a fluid coupling.

The lockup clutch 8 can perform a lockup operation of coupling the front cover 3 to the damper hub 7 via the damper device 10 and can cancel the lockup. The lockup clutch 8 has a lockup piston 80 that is disposed in the front cover 3 at a position near an engine side (the right side in the figure) inner wall surface of the front cover 3, and that is axially slidably and rotatably fitted on the damper hub 7. As shown in FIG. 1, a friction material 81 is bonded to an outer peripheral portion of the surface of the lockup piston 80 which is located on the front cover 3 side. A lockup chamber 85 that is connected to a hydraulic control device, not shown, via a hydraulic oil supply hole and an oil passage formed in the input shaft IS is defined between the lockup piston 80 and the front cover 3.

Hydraulic oil supplied from the hydraulic control device to the pump impeller 4 and the turbine runner 5 (torus) can flow into the lockup chamber 85. Accordingly, when the pressure in a fluid transmission chamber accommodating the pump impeller 4 and the turbine runner 5 is kept equal to that in the lockup chamber 85, the lockup piston 80 does not move toward the front cover 3 and does not frictionally engage with the front cover 3. However, if the pressure in the lockup chamber 85 is reduced by the hydraulic control device, not shown, the lockup piston 80 moves toward the front cover 3 due to the pressure difference and frictionally engages with the front cover 3. The front cover 3 is thus coupled to the damper hub 7 via the damper device 10. The lockup clutch 8 may be configured as a hydraulic multi-plate clutch.

As shown in FIGS. 1 and 2, the damper device 10 includes as rotary elements a drive member (input element) 11, an intermediate member (intermediate element) 12, and a driven member (output element) 15, and includes as power transmission elements a plurality of (in the present embodiment, four) first springs (first elastic bodies) SP1 and a plurality of (in the present embodiment, two) second springs (second elastic bodies) SP2 disposed inward of the first springs SP1. The intermediate member 12 is coupled to the drive member 11 via the plurality of first springs SP1, and the driven member 15 is coupled to the intermediate member 12 via the plurality of second springs SP2. In the present embodiment, the first springs SP1 disposed on the outer peripheral side of the damper device 10 are arc springs each made of a metal material wound so as to have an axis extending in an arc shape when not subjected to a load. This can further reduce rigidity (reduce the spring constant) of the first springs SP1 and can further reduce rigidity (implement a longer stroke) of the damper device 10. The second springs SP2 are coil springs each made of a metal material wound in a helical shape so as to have an axis extending straight when not subjected to a load. The second springs SP2 have higher rigidity (spring constant) than the first springs SP1.

The drive member 11 has a plurality of spring contact portions 11a each contacting one end of a corresponding one of the first springs SP1, and a plurality of spring support portions 11b. The drive member 11 is fixed to the lockup piston 80 of the lockup clutch 8 via a plurality of rivets, and is disposed in an outer peripheral region of a housing defined by the front cover 3 and the pump shell 40 of the pump impeller 4. The intermediate member 12 includes an annular first plate 13 disposed on the front cover 3 (lockup piston 80) side, and an annular second plate 14 disposed on the pump impeller 4 and turbine runner 5 side and coupled (fixed) to the first plate 13 via rivets.

As shown in FIG. 1, the first plate 13 of the intermediate member 12 has a plurality of first spring contact portions 13a each contacting the other end of a corresponding one of the first springs SP1, a plurality of second spring contact portions, not shown, each contacting one end of a corresponding one of the second springs SP2, and a plurality of spring support portions 13b supporting the first second springs SP2. In the present embodiment, each of the plurality of first spring contact portions 13a is extended outward from an annular inner peripheral portion of the first plate 13 and is extended in the axial direction of the starting device 1 toward the front cover 3. The second plate 14 has spring contact portions 14a (see FIG. 2) each contacting one end of a corresponding one of the second springs SP2, and a plurality of spring support portions 14b facing the spring support portions 13b of the first plate 13 and supporting the second springs SP2. The first and second plates 13, 14 hold the plurality of second springs SP2 so that the plurality of second springs SP2 are separated from the plurality of first springs SP1 in the radial and axial directions of the starting device 1. That is, in the present embodiment, the plurality of first springs SP1 are disposed so as to be shifted from the plurality of inner second springs SP2 toward the front cover 3 in the axial direction of the starting device 1 (damper device 10).

The driven member 15 has a plate portion 150 disposed between the first plate 13 and the second plate 14 of the intermediate member 12, and an inner peripheral portion of the plate portion 150 is fixed to the damper hub 7 by welding. The driven member 15 has a plurality of spring contact portions (output-side contact portions) 15a (see FIG. 2) each contacting the other end of a corresponding one of the second springs SP2. The driven member 15 further has a plurality of arc-shaped support holes 15h (see FIG. 2), and a roller 16, which is rotatably supported by the rivet coupling the first plate 13 and the second plate 14 of the intermediate member 12, is disposed in each support hole 15h in a rollable manner. The intermediate member 12 (the first plate 13 and the second plate 14) is thus movably supported around the axis of the starting device 1 and the damper device 10 by the driven member 15 via the support holes 15h and the rollers 16.

The centrifugal pendulum vibration absorbing device 20 is formed by the driven member 15 serving as a support member, which is the rotary element of the damper device 10, and a plurality of (e.g., three to four) pendulum mass bodies 21 swingably supported by the driven member 15 and adjoining each other in the circumferential direction. As shown in FIG. 1, the driven member 15 is formed in an annular shape so as to extend radially outward from the center side, and a plurality of guide holes 15g, which is, e.g., substantially arc-shaped elongated holes, are formed at regular intervals in an outer peripheral portion of the driven member 15. Each pendulum mass body 21 is formed by two metal plates (weights) 21a and a support shaft (roller) 22 that is inserted through the guide hole 15g of the driven member 15 in a rollable manner and that has the metal plates 21a fixed to both ends thereof. The driven member 15 is thus used also as a support member of the centrifugal pendulum vibration absorbing device 20, and as shown in FIGS. 1 and 2, the pendulum mass bodies 21 are disposed between the turbine runner 5 and the first springs SP1 of the damper device 10 at the positions outward of the second springs SP2 so as to surround the plurality of second springs SP2.

In the centrifugal pendulum vibration absorbing device 20 configured as described above, the plurality of pendulum mass bodies 21 swing in the same direction with respect to the driven member 15 when the driven member 15 serving as the support member supporting the pendulum mass bodies 21 rotates. Vibration having the opposite phase to that of vibration of the driven member 15 of the damper device 10 is thus applied to the driven member 15. In this manner, the centrifugal pendulum vibration absorbing device 20 can reduce the overall vibration level of the damper device 10. The configuration of the centrifugal pendulum vibration absorbing device 20 is not limited to that described above, and any configuration may be used. In the present embodiment, the centrifugal pendulum vibration absorbing device 20 also uses the driven member 15 as the support member supporting the pendulum mass bodies 21, and is therefore coupled to the driven member 15 of the damper device 10. However, the centrifugal pendulum vibration absorbing device 20 may be provided with a dedicated support member, and this support member may be coupled to the driven member 15 or the intermediate member 12 or the drive member 11 so as to rotate together therewith.

The dynamic damper 30 includes a plurality of (in the present embodiment, two) third springs (third elastic bodies) SP3 and a coupling member 31 that is coupled to the third springs SP3 and that together with the turbine runner 5 and the turbine hub 52 forms a mass body (see FIG. 2). The "dynamic damper" is a mechanism that applies vibration of the opposite phase to a vibrating body at the same frequency (engine speed) as the resonance frequency of the vibrating body to damp vibration, and is formed by coupling the springs and the mass body to the vibrating body so that the springs and the mass body are not included in a torque transmission path. The dynamic damper can be operated at a desired frequency by adjusting the rigidity of the springs and the weight of the mass body.

Arc springs or coil springs are used as the third springs SP3 of the dynamic damper 30. The plurality of third springs SP3 are supported by the coupling member 31 and disposed one by one between adjoining ones of the second springs SP2 so as to lie in the same radial plane of the starting device 1 and the damper device 10. That is, the third springs SP3 lie along the same axial position as the second springs SP2 as viewed in the radial direction of the starting device 1 and the damper device 10 (as viewed in the direction shown by a white arrow in FIG. 1), and do not overlap the second springs SP2 as viewed in the axial direction of the starting device 1 and the damper device 10 (as viewed in the direction shown by a thick black arrow in FIG. 1). This can suppress an increase in outer diameter of the damper device 10 as compared to the case where the third springs SP3 of the dynamic damper 30 are disposed radially outward or inward of the second springs SP2 or disposed between the first and second springs SP1, SP2 in the radial direction.

In the present embodiment, the plurality of second springs SP2 and the plurality of third springs SP3 are disposed on a concentric circle as shown in FIG. 2, and the distance r2 between the axis of the starting device 1 and the damper device 10 and the axis of each second spring SP2 is the same as the distance r3 between the axis of the starting device 1 and the damper device 10 and the axis of each third spring SP3. This can more satisfactorily suppress an increase in outer diameter of the damper device 10. Moreover, in the present embodiment, the second springs SP2 and the third springs SP3 are disposed so that their axes are included in the same plane PL (see FIG. 1) perpendicular to the axis of the starting device 1 and the damper device 10. This can also suppress an increase in axial length of the damper device 10.

The coupling member 31 of the dynamic damper 30 has an annular shape, and an inner peripheral portion (annular fixed portion) 31a of the coupling member 31 together with the turbine shell 50 is fixed to the turbine hub 52 (and the turbine runner 5) via rivets such that the inner peripheral portion 31a contacts the back surface (the front cover 3 side surface) of an inner peripheral portion of the turbine shell 50 of the turbine runner 5. The coupling member 31 together with the turbine shell 50 and the turbine hub 52 is therefore rotatably supported by the damper hub 7. The coupling member 31 has a plurality of spring support portions 31b that face the spring support portions 13b of the first plate 13 of the intermediate member 12 and support the second springs SP2. A plurality of spring contact portions (elastic body contact portions serving as engagement portions) 31c each contacting (engaging with) one end of a corresponding one of the third springs SP3 are extended outward from the inner peripheral portion 31a of the coupling member 31 toward the front cover 3. That is, as shown in FIGS. 1 and 2, each of the plurality of spring contact portions 31c is extended from the inner peripheral portion 31a via a bent portion 31f so as to extend away from the inner peripheral portion 31a in the axial direction (extend toward the front cover 3) and to extend radially outward. In the present embodiment, as shown in FIG. 2, the coupling member 31 has, e.g., two pairs of spring contact portions 31c disposed symmetrically with respect to the axis of the starting device 1 and the damper device 10 such that each pair of (two) spring contact portions 31c face each other at an interval according to the natural length of the third spring SP3.

Moreover, as shown in FIG. 2, the plate portion 150 of the driven member 15 has a plurality of (in the present embodiment, two) openings (holes or cutouts) 15o formed at regular intervals about the axis of the starting device 1 and the damper device 10. Each pair of spring contact portions 31c and the third spring SP3 supported by the pair of spring contact portions 31c are placed in a corresponding one of the openings 15o. That is, as shown in FIG. 2, the plurality of spring contact portions 31c of the coupling member 31 are placed pair by pair in the openings 15o formed in the plate portion 150 of the driven member 15, and each pair of spring contact portions 31c support the third spring SP3 such that the third spring SP3 is located next to the second springs SP2 in the circumferential direction. The spring contact portions 31c are thus made to overlap the driven member 15 in the axial direction (are placed so as to overlap the driven member 15 as viewed in the radial direction). This can suppress an increase in axial length of the damper device 10, and allows the spring contact portions 31c of the coupling member 31 to contact (engage with) the centers (the central portions in the lateral direction, i.e., in the axial direction of the damper device 10) of the ends of the third springs SP3. That is, as can be seen from FIGS. 1 and 2, the plane PL including the axes of the third springs SP3 and perpendicular to the axis of the damper device 10 is included in the range of the thickness of the spring contact portions 31c of the coupling member 31 in the axial direction of the damper device 10, and the inner peripheral portion (fixed portion) 31a of the coupling member is fixed to the turbine runner 5 at a position shifted in the axial direction from the plane PL (on the left side in FIG. 1). In other words, the coupling member 31 is fixed to the turbine runner 5 serving as the mass body so that end faces (contact surfaces) of the spring contact portions 31c which contact the third springs SP3 cross the plane PL. Like the plurality of second springs SP2, the plurality of third springs are also surrounded by the plurality of pendulum mass bodies 21 of the centrifugal pendulum vibration absorbing device 20 which are disposed between the turbine runner 5 and the first springs SP1 of the damper device 10 at the positions outward of the third springs.

In the present embodiment, as shown in FIG. 2, the second plate 14 of the intermediate member 12 has second spring contact portions (second intermediate-side contact portions) 14c each contacting one end of a corresponding one of the third springs SP3, and the first plate 13 facing the second plate 14 with the driven member 15 interposed therebetween has third spring contact portions (first intermediate-side contact portions) 13c each contacting one end of a corresponding one of the third springs SP3. Accordingly, when the engine is rotated and the intermediate member 12 is rotated by the torque from the engine, each of the third spring contact portions 13c of the first plate 13 and each of the second spring contact portions 14c of the second plate 14 presses the one end of a corresponding one of the third springs SP3, and the other end of each of the third springs SP3 presses one spring contact portion 31c of a corresponding one of the pairs of spring contact portions 31c of the coupling member 31. As a result, when the turbine runner 5 is not involved in power (torque) transmission, the dynamic damper 30 is formed by the third springs SP3 being extended and compressed between the intermediate member 12 and the coupling member 31 (turbine runner 5), and the dynamic damper 30 including the plurality of third springs SP3, the turbine runner 5 serving as the mass body, etc. is coupled to the intermediate member 12 of the damper device 10.

Moreover, since the plate portion 150 of the driven member 15, the spring contact portions 31c of the coupling member 31, the second springs SP2, and the third springs SP3 are disposed as described above, the centerlines in the thickness direction of the spring contact portions 15a of the plate portion 150 and the spring contact portions 31c and the axes of the second springs SP2 and the third springs SP3 are included in the plane PL perpendicular to the axis of the damper device 10. The plate portion 150 (spring contact portion 15a) of the driven member 15 and the spring contact portions 31c of the coupling member 31 are placed between the first plate 13 and the second plate 14 of the intermediate member 12, and each spring contact portion 31c is placed between the spring contact portion 13c of the first plate 13 and the spring contact portion 14c of the second plate 14 which face each other, namely in the middle in the axial direction of the damper device 10 between the spring contact portion 13c and the spring contact portion 14c which face each other.

Figure 3:
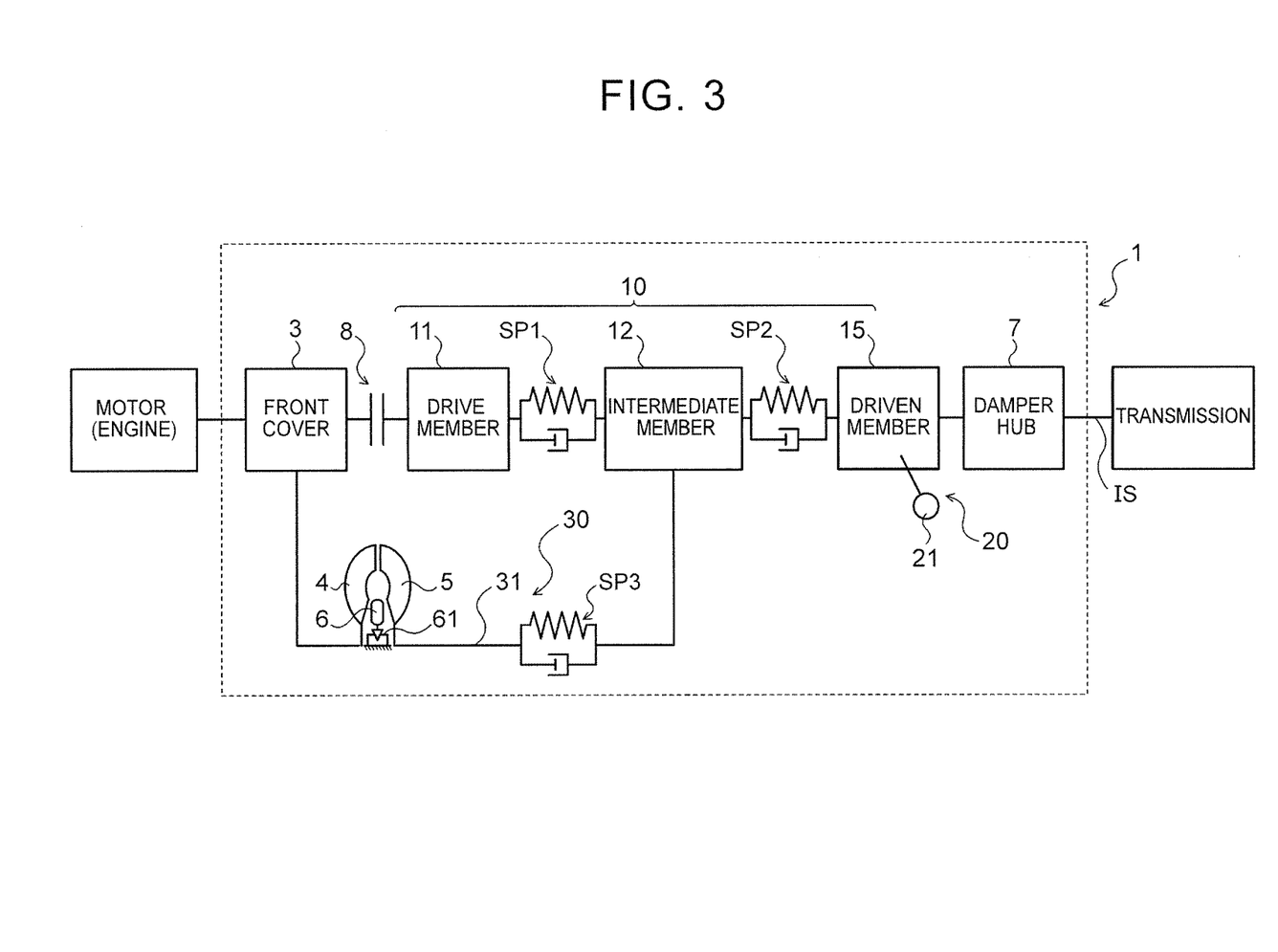
FIG. 3 is a schematic configuration diagram showing the starting device 1.

Operation of the starting device 1 configured as described above will be described below with reference to FIG. 3.

When lockup is cancelled by the lockup clutch 8 of the starting device 1, torque (power) from the engine serving as a motor is transferred to the input shaft IS of the transmission through a path of the front cover 3, the pump impeller 4, the turbine runner 5, the coupling member 31, the third springs SP3, the intermediate member 12, the second springs SP2, the driven member 15, and the damper hub 7. In the present embodiment, the third springs SP3 are disposed so as to overlap the second springs SP2 both in the axial and radial directions of the damper device 10 etc. This can further reduce rigidity (reduce the spring constant) of the first springs SP1 disposed outward of the second and third springs SP2, SP3 and thus further improve damping capability of the damper device 10, and can also ensure a sufficient size (outer diameter) of the second and third springs SP2, SP3 and thus satisfactorily maintain rigidity (durability) of the second and third springs SP2, SP3, as compared to the case where the first to third springs SP1, SP2, SP3 are disposed next to each other in the radial direction of the damper device 10. Accordingly, in the starting device 1, torque can be satisfactorily transferred from the front cover 3 to the input shaft IS of the transmission even if the second springs SP2 and the third springs SP3 are included in the power transmission path from the front cover 3 to the input shaft IS of the transmission when the lockup is cancelled.

On the other hand, when a lockup operation is performed by the lockup clutch 8 of the starting device 1, torque (power) from the engine serving as a motor is transferred to the input shaft IS of the transmission device through a path of the front cover 3, the lockup clutch 8, the drive member 11, the first springs SP1, the intermediate member 12, the second springs SP2, the driven member 15, and the damper hub 7, as can be seen from FIG. 2. At this time, fluctuations in torque applied to the front cover 3 are damped (absorbed) mainly by the first and second springs SP1, SP2 of the damper device 10. In this case, since the pump impeller 4 and the turbine runner 5 (fluid transmission device) are not involved in the torque transmission between the front cover 3 and the input shaft IS of the transmission, the dynamic damper 30 including the plurality of third springs SP3, the turbine runner 5 serving as the mass body, etc. is coupled to the intermediate member 12 of the damper device 10. Vibration of the intermediate member 12 that tends to vibrate between the first and second springs SP1, SP2 can thus be satisfactorily damped (absorbed) by the dynamic damper 30.

Moreover, in the starting device 1, when the damper device 10 coupled to the front cover 3 by the lockup operation of the lockup clutch 8 rotates together with the front cover 3, the driven member 15 of the damper device 10 also rotates about the axis of the starting device 1. As the driven member 15 rotates, the pendulum mass bodies 21 of the centrifugal pendulum vibration absorbing device 20 swing in the same direction with respect to the driven member 15. Vibration having the opposite phase to vibration (resonance) of the driven member 15 is thus applied from the centrifugal pendulum vibration absorbing device 20 to the driven member 15, whereby vibration can also be damped (absorbed) between the front cover 3 and the damper hub 7 by the centrifugal pendulum vibration absorbing device 20.

As described above, the damper device 10 of the starting device 1 includes the dynamic damper 30 that has the third springs SP3 coupled to the intermediate member 12 and that also has, as the mass body coupled to the third springs SP3, the turbine runner 5, the coupling member 31, and the turbine hub 52. The third springs SP3 of the dynamic damper 30 are disposed so as to overlap both in the axial and radial directions of the damper device 10 the second springs SP2 that have higher rigidity than the first springs SP1 and that are disposed inward of the first springs SP1 to transfer torque between the drive member 11 and the driven member 15. In the damper device 10, the plane PL including the axes of the third springs SP3 and perpendicular to the axis of the damper device 10 is included in the range of the thickness in the axial direction of the spring contact portions 31c of the coupling member 31.

This can suppress an increase in outer diameter of the damper device 10 and can make the entire device more compact as compared to the case where the third springs SP3 of the dynamic damper 30 are disposed radially outward or inward of the first springs SP1 and the second springs SP2 or disposed between the first and second springs SP1, SP2 in the radial direction. Moreover, since the plane PL including the axes of the third springs SP3 and perpendicular to the axis of the damper device 10 is included in the range of the thickness in the axial direction of the spring contact portions 31c of the coupling member 31, the third springs SP3 can be more appropriately extended and compressed along their axes, and vibration damping capability of the dynamic damper 30 can further be improved. In addition, in the damper device 10, the third springs SP3 can be placed without increasing the rigidity of the first springs SP1. Namely, both the second and third springs SP2, SP3 can be placed while the low rigidity of the first springs SP1 is maintained which particularly affects the damping capability. That is, reducing the rigidity of the first springs SP1 can reduce the overall rigidity of the damper device 10 and can ensure satisfactory damping capability thereof even if the axial length (circumferential length) of the inner second springs SP2 is reduced. Accordingly, sufficient space can be secured to place the third springs SP3 of the dynamic damper 30, and the appropriate third springs SP3 according to vibration to be damped can be used. Namely, the damping capability of the dynamic damper can be optimized. As a result, in the damper device 10, the overall damping capability of the device can be ensured, and reduction in size of the device can also be implemented.

In the damper device 10, the coupling member 31 has the inner peripheral portion (fixed portion) 31a that is fixed to the turbine runner 5 serving as the mass body at the position shifted in the axial direction from the plane PL including the axes of the third springs SP3 and perpendicular to the axis of the damper device 10. Each of the plurality of spring contact portions 31c is extended from the inner peripheral portion 31a via the bent portion 31f. The spring contact portions 31c are thus shifted from the inner peripheral portion 31a in the axial direction of the damper device 10. Accordingly, even though the third springs SP3 of the dynamic damper 30 are disposed so as to be shifted from the turbine runner 5 as the mass body in the axial direction of the damper device 10, an increase in overall size of the device can be suppressed, and the third springs SP3 and the turbine runner 5 can be fixed with respect to each other.

Moreover, in the damper device 10, the driven member 15 includes the plate portion 150 having the plurality of spring contact portions (output-side contact portions) 15a each contacting the end of a corresponding one of the second springs SP2. The plurality of spring contact portions 31c of the coupling member 31 are disposed pair by pair in the openings 15o formed in the plate portion 150 of the driven member 15, and each pair of spring contact portions 31c support the third spring SP3 so that the third spring SP3 is located next to the second springs SP2 in the circumferential direction. The plate portion 150 of the driven member 15, the spring contact portions 31c of the coupling member 31, the second springs SP2, and the third springs SP3 are disposed so that the centerlines in the thickness direction of the plate portion 150 (spring contact portions 15a) and the spring contact portions 31c and the axes of the second springs SP2 and the third springs SP3 are included in the same plane PL perpendicular to the axis of the damper device 10.

Since the spring contact portions 31c of the coupling member 31 are thus disposed in the openings 15o formed in the plate portion 150 of the driven member 15, the plate portion 150 and the spring contact portions 31c of the coupling member 31 are made not to be located next to each other in the axial direction of the damper device 10. This can suppress an increase in axial length of the damper device 10 and can make the entire device compact. In addition, since the centerlines in the thickness direction of the plate portion 150 (spring contact portions 15a) and the spring contact portions 31c and the axes of the second and third springs SP2, SP3 are included in the same plane PL perpendicular to the axis of the damper device 10, the second springs SP2 and the third springs SP3 can be more appropriately extended and compressed along their axes, and vibration damping capability of the damper device 10 including the dynamic damper 30 can further be improved. However, the centerlines in the thickness direction of the spring contact portions 15a and the spring contact portions 31c and the axes of the second and third springs SP2, SP3 are not necessarily completely included in the same plane PL perpendicular to the axis of the damper device 10. That is, the plate portion 150 of the driven member 15, the coupling member 31, and the second and third springs SP2, SP3 need only to be placed so that the plane PL including the axes of the third springs SP3 and perpendicular to the axis of the damper device 10 is included in the range of the thicknesses of the spring contact portions 15a of the plate portion 150 and the spring contact portions 31c of the coupling member 31 in the axial direction of the damper device 10.

Moreover, in the damper device 10, the intermediate member 12 includes the first and second plates 13, 14 that are coupled to each other, and the plate portion 150 of the driven member 15 and the spring contact portions 31c of the coupling member 31 are disposed between the first plate 13 and the second plate 14. This can suppress an increase in axial length of the damper device 10. The first plate 13 of the intermediate member 12 has the plurality of spring contact portions (first intermediate-side contact portions) 13c each contacting the end of a corresponding one of the third springs SP3, and the second plate 14 has the plurality of spring contact portions (second intermediate-side contact portions) 14c each contacting the end of a corresponding one of the third springs SP3. Each spring contact portion 31c of the coupling member 31 is disposed between the spring contact portion 13c and the spring contact portion 14c. This has an effect similar to the case where the intermediate member is formed by a single plate member and the plane PL including the axes of the third springs SP3 and perpendicular to the axis of the damper device 10 is included in the range of the thickness of contact portions of the intermediate member with the third springs SP3 in the axial direction of the damper device 10 (the intermediate member is made to contact the central portions of the ends of the third springs SP3 in the lateral direction, i.e., in the axial direction of the damper device 10). As a result, the third springs SP3 can be more appropriately extended and compressed along their axes between the intermediate member 12 (first and second plates 13, 14) and the coupling member 31, and vibration damping capability of the damper device 10 can further be improved.

An increase in outer diameter of the damper device 10 can be more satisfactorily suppressed by making the distance r2 between the axis of the damper device 10 and the axis of each second spring SP2 the same as the distance r3 between the axis of the damper device 10 and the axis of each third spring SP3 as in the above embodiment. Moreover, an increase in axial length of the damper device 10 can also be suppressed because the axes of the second springs SP2 and the axes of the third springs SP3 are included in the same plane PL perpendicular to the axis of the damper device 10 in the above embodiment. This can make the entire starting device 1 more compact.

In the above embodiment, the driven member 15 of the damper device 10 together with the plurality of pendulum mass bodies 21 swingably coupled to the driven member 15 forms the centrifugal pendulum vibration absorbing device 20. The first springs SP1 are disposed so as to be shifted from the second springs SP2 in the axial direction. The plurality of pendulum mass bodies 21 of the centrifugal pendulum vibration absorbing device 20 are disposed outward of the second and third springs SP2, SP3 so as to surround the second and third springs SP2, SP3 located next to each other in the circumferential direction. Accordingly, an increase in overall size of the damper device 10 including the centrifugal pendulum vibration absorbing device 20 can be more satisfactorily suppressed (in particular, an increase in axial length thereof can be suppressed), and vibration can be damped (absorbed) by the first and second springs SP1, SP2, the centrifugal pendulum vibration absorbing device 20, and the dynamic damper 30 including the third spring SP3.

Figure 4:
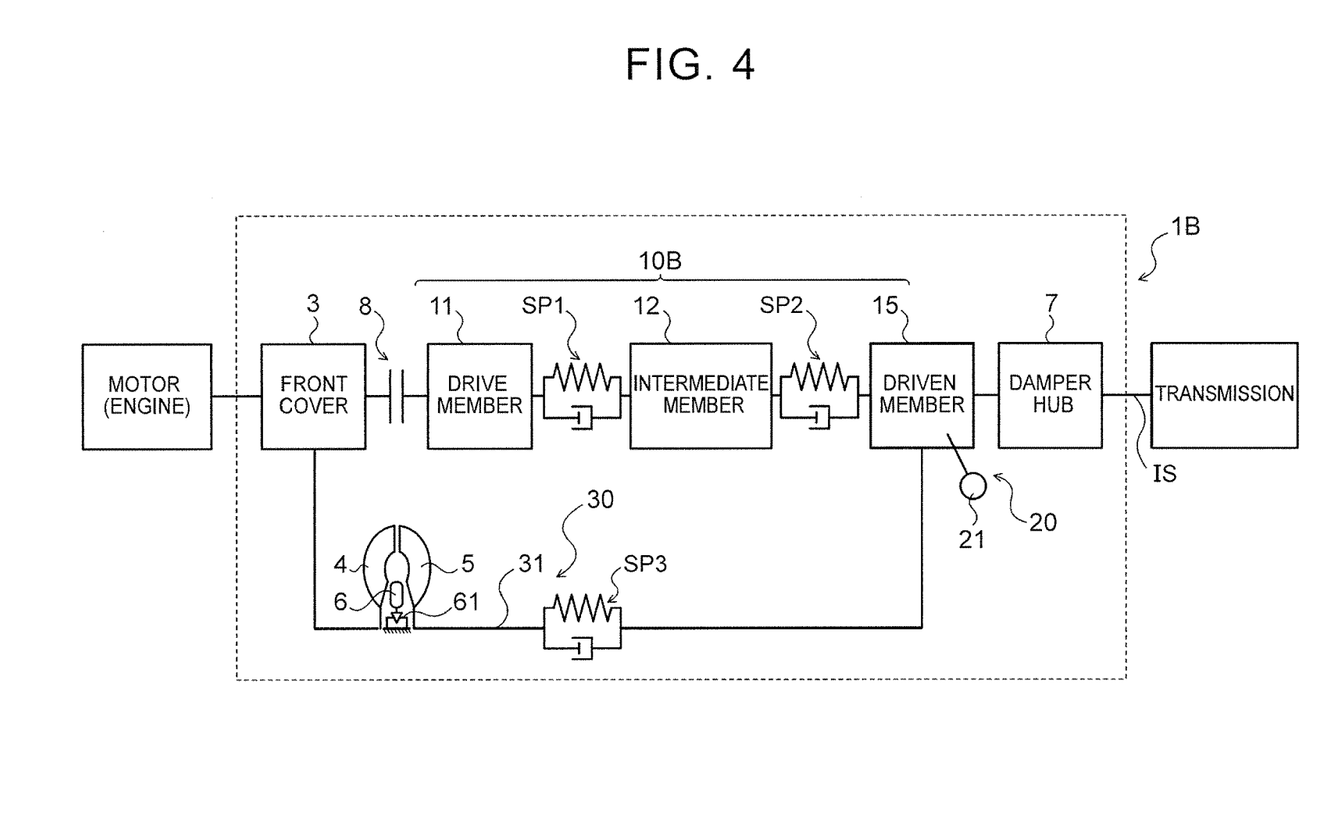
FIG. 4 is a schematic configuration diagram showing a starting device 1B including a damper device 10B according to a modification.

The damper device 10 includes the intermediate member 12 that is coupled to the drive member 11 via the first springs SP1 and that is coupled to the driven member 15 via the second springs SP2. The third springs SP3 of the dynamic damper 30 are coupled to the intermediate member 12, and the driven member 15 is used also as the support member of the centrifugal pendulum vibration absorbing device 20. The entire damper device 10 including the centrifugal pendulum vibration absorbing device 20 and the dynamic damper 30 can thus be made compact, and vibration of the intermediate member 12 that tends to vibrate between the first and second springs SP1, SP2 and overall vibration of the damper device 10 can be satisfactorily damped (absorbed) by both the centrifugal pendulum vibration absorbing device 20 and the dynamic damper 30. Instead of coupling the third springs SP3 of the dynamic damper 30 to the intermediate member 12 (coupling the coupling member 31 to the intermediate member 12 via the third springs SP3), the third springs SP3 of the dynamic damper 30 may be coupled to the driven member 15 (the coupling member 31 may be coupled to the driven member 15 via the third springs SP3), as in a damper device 10B of a starting device 1B shown in FIG. 4. In this configuration as well, overall vibration of the damper device 10B can be satisfactorily damped (absorbed) by both the centrifugal pendulum vibration absorbing device 20 and the dynamic damper 30.

In the starting device 1, the dynamic damper 30 includes the coupling member 31 that has the inner peripheral portion 31a fixed to the turbine runner 5 and the spring contact portions 31c serving as the engagement portions (elastic body contact portions) extended outward from the inner peripheral portion 31a to contact (engage with) one ends of the third springs SP3. The turbine runner 5 is rotatably supported by the damper hub 7 to which the driven member 15 is fixed, and is coupled to the third springs SP3 via the coupling member 31. The driven member 15 has the openings 15o in which the spring contact portions 31c of the coupling member 31 and the third springs SP3 are disposed. Accordingly, in the starting device 1, the turbine runner 5 can be used as the mass body of the dynamic damper 30, and the spring contact portions 31c of the coupling member 31 can be made to contact (engage with) the third springs SP3 more appropriately while an increase in axial length is suppressed.

In the above damper devices 10, 10B, the first springs SP1 and the second springs SP2 operate in series via the intermediate member 12. However, the damper devices 10, 10B may be configured so that the first springs SP1 and the second springs SP2 operate in parallel. That is, the damper devices 10, 10B may be configured either as a series damper device having a drive member, an intermediate member, and a driven member as rotary elements or as a parallel damper device having a drive member, an intermediate member, and a driven member as rotary elements. As described above, the turbine runner 5 can be used as the mass body of the dynamic damper 30 by fixing the coupling member 31 to the turbine runner 5. An increase in size of the starting device 1 can thus be satisfactorily suppressed. However, the dynamic damper 30 may be configured to include a dedicated mass body other than the turbine runner 5. Moreover, in the case where the turbine runner 5 is not used as the mass body of the dynamic damper 30, the turbine runner 5 may be connected (fixed) to any of the drive member, the intermediate member, and the driven member.

In the preferred embodiment, the damper device 10, 10B including the drive member 11 serving as the input element, the driven member 15 serving as the output element, the first springs SP1 serving as the first elastic bodies that transfer torque between the drive member 11 and the driven member 15, and the second springs SP2 serving as the second elastic bodies that are disposed inward of the first springs SP1 to transfer torque between the drive member 11 and the driven member 15 corresponds to the "damper device." The dynamic damper 30 having the third springs SP3 serving as the third elastic bodies coupled to the intermediate member 12 of the damper device 10, 10B, the turbine runner 5 serving as the mass body coupled to the third springs SP3, etc. corresponds to the "dynamic damper." The centrifugal pendulum vibration absorbing device 20 having the driven member 15 serving as the support member and the plurality of pendulum mass bodies 21 swingably coupled to the driven member 15 corresponds to the centrifugal pendulum vibration absorbing device." The coupling member 31 having the inner peripheral portion 31a fixed to the turbine runner 5 and the spring contact portions 31c serving as the elastic body contact portions extended outward from the inner peripheral portion 31a to engage with one ends of the third springs SP3 corresponds to the "coupling member."

Although a preferred embodiment is described above, it should be understood that t various modifications can be made.

INDUSTRIAL APPLICABILITY

The subject matter described herein is applicable to the manufacturing industry of damper devices and starting devices including the same, etc.

The invention claimed is:

1. A damper device comprising:
    an input element;
    an intermediate element;
    an output element;
    first elastic bodies that transfer torque between the input element and the intermediate element; and
    second elastic bodies that transmit torque between the intermediate element and the output element, the second elastic bodies are disposed radially inward of the first elastic bodies to transfer the torque between the intermediate element and the output element, wherein
    the second elastic bodies have higher rigidity than the first elastic bodies,
    the damper device comprises a dynamic damper having third elastic bodies that are coupled to any of the rotary elements at one end of each of the third elastic bodies forming the damper device and a mass body that is coupled to the third elastic bodies at another end of each of the third elastic bodies, and
    the third elastic bodies are coplanar with the second elastic bodies in a plane perpendicular to an axial direction along a rotational axis of the damper device and are disposed along a same radial distance from the rotational axis.

2. The damper device according to claim 1, further comprising:
    a centrifugal pendulum vibration absorbing device having a support member that rotates together with any of the rotary elements forming the damper device, and a plurality of pendulum mass bodies that are swingably coupled to the support member, wherein
    the first elastic bodies are axially spaced from the second elastic bodies in the axial direction, and
    the plurality of pendulum mass bodies of the centrifugal pendulum vibration absorbing device are disposed outward of the second and third elastic bodies so as to surround the second and third elastic bodies.

3. The damper device according to claim 2, wherein
    the torque is transferred from the second elastic bodies to the output element, and
    the output element is used also as the support member of the centrifugal pendulum vibration absorbing device.

4. The damper device according to claim 1, further comprising:

an intermediate element that is coupled to the input element via the first elastic bodies and coupled to the output element via the second elastic bodies, wherein
the third elastic bodies of the dynamic damper are coupled to the intermediate element.

5. The damper device according to claim 1, wherein the third elastic bodies of the dynamic damper are coupled to the output element.

6. The damper device according to claim 1, wherein a distance between an axis of the damper device and an axis of each of the second elastic bodies is equal to a distance between the axis of the damper device and an axis of each of the third elastic bodies.

7. The damper device according to claim 6, wherein the axis of the second elastic bodies and the axis of the third elastic bodies are included in a same plane perpendicular to the axis of the damper device.

8. The damper device according to claim 1, wherein the dynamic damper includes a coupling member having a fixed portion that is fixed to the mass body and a plurality of elastic body contact portions each extended from the fixed portion so as to contact an end of a corresponding one of the third elastic bodies, and
a plane including an axis of the third elastic bodies and the plane is perpendicular to the axial direction of the damper device is included in a range of a thickness of the elastic body contact portions in the axial direction of the damper device.

9. A starting device including the damper device according to claim 1, further including a pump impeller, a turbine runner that together with the pump impeller forms a fluid transmission device, and a lockup clutch, and wherein
the mass body of the dynamic damper includes the turbine runner.

10. The damper device according to claim 2, further comprising:
an intermediate element that is coupled to the input element via the first elastic bodies and coupled to the output element via the second elastic bodies, wherein
the third elastic bodies of the dynamic damper are coupled to the intermediate element.

11. The damper device according to claim 2, wherein the third elastic bodies of the dynamic damper are coupled to the output element.

12. The damper device according to claim 2, wherein a distance between an axis of the damper device and an axis of each of the second elastic bodies is equal to a distance between the axis of the damper device and an axis of each of the third elastic bodies.

13. The damper device according to claim 2, wherein the axis of the second elastic bodies and the axis of the third elastic bodies are included in a same plane perpendicular to the axis of the damper device.

14. The damper device according to claim 2, wherein the dynamic damper includes a coupling member having a fixed portion that is fixed to the mass body and a plurality of elastic body contact portions each extended from the fixed portion so as to contact an end of a corresponding one of the third elastic bodies, and
the plane including the axes of the third elastic bodies and perpendicular to the axis of the damper device is included in a range of a thickness of the elastic body contact portions in the axial direction of the damper device.

15. The damper device according to claim 3, further comprising:
an intermediate element that is coupled to the input element via the first elastic bodies and coupled to the output element via the second elastic bodies, wherein
the third elastic bodies of the dynamic damper are coupled to the intermediate element.

16. The damper device according to claim 15, wherein the third elastic bodies of the dynamic damper are coupled to the output element.

17. The damper device according to claim 16, wherein a distance between an axis of the damper device and an axis of each of the second elastic bodies is equal to a distance between the axis of the damper device and an axis of each of the third elastic bodies.

18. The damper device according to claim 17, wherein the axis of the second elastic bodies and the axis of the third elastic bodies are included in a same plane perpendicular to the axis of the damper device.

19. The damper device according to claim 18, wherein the dynamic damper includes a coupling member having a fixed portion that is fixed to the mass body and a plurality of elastic body contact portions each extended from the fixed portion so as to contact an end of a corresponding one of the third elastic bodies, and
the plane including the axes of the third elastic bodies and perpendicular to the axis of the damper device is included in a range of a thickness of the elastic body contact portions in the axial direction of the damper device.

20. A starting device including the damper device according to claim 19, further comprising a pump impeller, a turbine runner that together with the pump impeller forms a fluid transmission device, and a lockup clutch, wherein
the mass body of the dynamic damper includes the turbine runner.

* * * * *